US011998147B2

(12) United States Patent
Chen

(10) Patent No.: US 11,998,147 B2
(45) Date of Patent: Jun. 4, 2024

(54) TOOTH-BRUSHING CUP AND HEATING DEVICE

(71) Applicant: Taishan University, Tai'an (CN)

(72) Inventor: Hongsheng Chen, Tai'an (CN)

(73) Assignee: Taishan University, Tai'an (CN)

( * ) Notice: Subject to any disclaimer, the term of this patent is extended or adjusted under 35 U.S.C. 154(b) by 732 days.

(21) Appl. No.: 17/262,904

(22) PCT Filed: Jun. 9, 2020

(86) PCT No.: PCT/CN2020/095127
§ 371 (c)(1),
(2) Date: Jan. 25, 2021

(87) PCT Pub. No.: WO2021/093319
PCT Pub. Date: May 20, 2021

(65) Prior Publication Data
US 2022/0110491 A1 Apr. 14, 2022

(30) Foreign Application Priority Data
Nov. 12, 2019 (CN) ........................ 201911097297.7

(51) Int. Cl.
*A47K 5/18* (2006.01)
*A46B 17/08* (2006.01)
(Continued)

(52) U.S. Cl.
CPC ................ *A47K 5/18* (2013.01); *A46B 17/08* (2013.01); *H05B 6/06* (2013.01); *H05B 6/108* (2013.01)

(58) Field of Classification Search
CPC . A46B 17/08; A47K 5/18; A47K 1/09; H05B 6/06; H05B 6/108
See application file for complete search history.

(56) References Cited

U.S. PATENT DOCUMENTS

2016/0023887 A1* 1/2016 Laghi .................... H01R 11/12 219/214
2017/0303344 A1* 10/2017 Laghi .................... H05B 6/105

FOREIGN PATENT DOCUMENTS

CN 201488055 U 5/2010
CN 202589249 U 12/2012
(Continued)

OTHER PUBLICATIONS

International Search Report, PCT/CN2020/095127, dated Sep. 11, 2020, 5 pages.

*Primary Examiner* — Dana Ross
*Assistant Examiner* — Joe E Mills, Jr.
(74) *Attorney, Agent, or Firm* — Edell, Shapiro & Finnan, LLC

(57) ABSTRACT

A tooth-brushing cup and heating device consists of a tooth-brushing cup, a hoop, a base and the like an electromagnetic coil, a control circuit and the like are arranged in the base, a display window is arranged at the upper part of the base. Four buttons are arranged above the display window for setting the temperature and the heating time respectively, and a power switch is arranged on the right side of the display window. The hoop is installed on the base, and a conical surface inside the hoop is attached to the outer conical surface of the tooth-brushing cup. The tooth-brushing cup is made of stainless steel by stamping and is in a circular table shape, and a side plane is stamped on the side wall of the tooth-brushing cup to be tightly attached to a base panel.

3 Claims, 3 Drawing Sheets

(51) Int. Cl.
*H05B 6/06* (2006.01)
*H05B 6/10* (2006.01)

(56) References Cited

FOREIGN PATENT DOCUMENTS

| | | | |
|---|---|---|---|
| CN | 204427893 | U | 7/2015 |
| CN | 108209672 | U | 6/2018 |
| CN | 110772150 | A | 2/2020 |
| JP | 2012245992 | A | 12/2012 |

* cited by examiner

TOOTH-BRUSHING CUP AND HEATING DEVICE

CROSS REFERENCE TO RELATED APPLICATIONS

This application is a national stage application of PCT/CN2020/095127, filed Jun. 9, 2020 and entitled "Tooth-Brushing Cup And Heating Device", which claims priority to Chinese Patent Application No. 201911097297.7, filed Nov. 12, 2019, the disclosures of which are incorporated herein by reference in their entireties.

TECHNICAL FIELD

The disclosure relates to a tooth-brushing cup and heating device.

BACKGROUND

At present, people often feel uncomfortable when brushing teeth due to the fact that tooth brushing water is cold, sometimes hot water cannot be found if hot water is mixed, and even if the hot water is well mixed, people feel troublesome and time is wasted.

SUMMARY

The disclosure provides a tooth-brushing cup and heating device aiming at the defects in the prior art. The tooth-brushing cup and heating device consists of a tooth-brushing cup, a hoop, a base and the like, an electromagnetic coil and a control circuit are arranged in the base, a display window is arranged at the upper part of the base, and the display window is used for displaying a current temperature value, a set temperature value and a countdown value of heating time. Four buttons are arranged above the display window for setting temperature increase and decrease as well as heating time increase and decrease respectively, and a power switch is arranged on the right side of the display window. The hoop is installed on the base, and a conical surface inside the hoop is attached to the outer conical surface of the tooth-brushing cup. The tooth-brushing cup is made of food-grade stainless steel by stamping. The tooth-brushing cup is generally in a circular table shape and is large in top and small in bottom. A side plane is stamped on the side wall of the tooth-brushing cup, and the side plane is tightly attached to a base panel. The bottom surface of the tooth-brushing cup is suspended in the air. Under the combined action of the gravity and the conical surface inside the hoop the side plane on the tooth-brushing cup is tightly attached to the base panel, and meanwhile, water on the outer wall of the tooth-brushing cup naturally drops and cannot accumulate.

Further, a conical surface of the tooth-brushing cup is attached to a conical surface in the hoop, and the side plane on the tooth-brushing cup is attached to the base panel while the tooth-brushing cup sinks under the action of gravity, so that good heating effect is guaranteed.

Further, the tooth-brushing cup is made of food-grade stainless steel by stamping, is generally in a circular table shape and is large in top and small in bottom, a side plane is stamped on the side wall of the circular conical surface of the tooth-brushing cup, and the side plane is tightly attached to the base panel.

The beneficial effects of the tooth-brushing cup and heating device provided by the disclosure are as follows: when alternating current is introduced into the electromagnetic coil in the base, eddy current is generated in the stainless steel side plane of the tooth-brushing cup attached to the base panel. The eddy current heats the tooth-brushing cup, and the metal wall of the side plane further heats water in the tooth-brushing cup. A thermistor is arranged in the control circuit and used for sensing the temperature transmitted by the tooth-brushing cup, and heating is automatically stopped when the temperature reaches the set temperature. The control circuit can also control the heating time. A user can set the heating time according to needs, and when the set time is up, heating is automatically stopped. In the using process, one of the temperature and the heating time is set. The set values of the temperature or the heating time can be stored for a long time after the temperature or the heating time is set. The tooth-brushing cup and heating device can be heated according to the set temperature or the set heating time only by turning on a power supply every time in use, and the tooth-brushing cup is short in heating time and waiting time in use due to the fact that the water volume is small and the temperature does not need to be too high. Due to the fact that the application range of people to the temperature of tooth brushing water is large, the precision requirement for heating temperature setting and heating time setting is not high, and the device is convenient to use.

Figure 1:
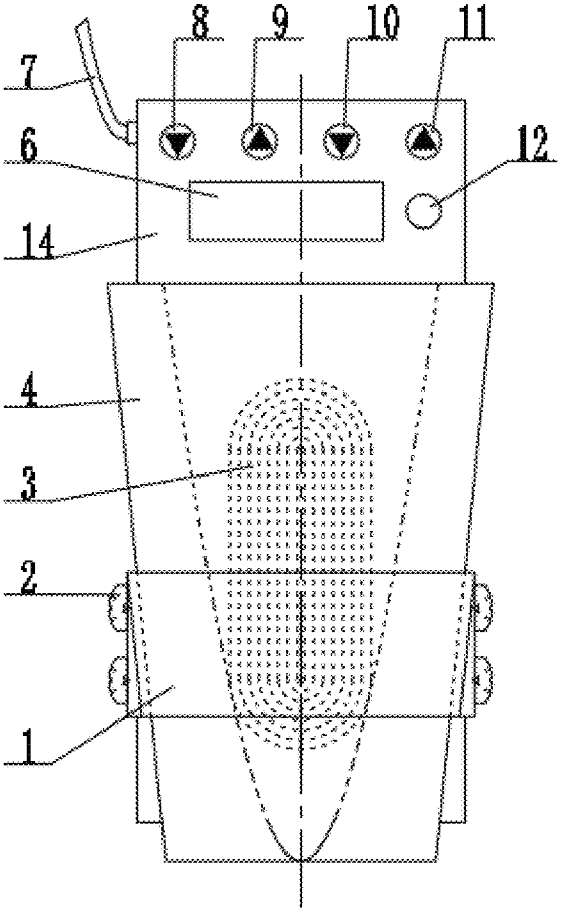
FIG. 1 is a front view of the disclosure.
Figure 2:
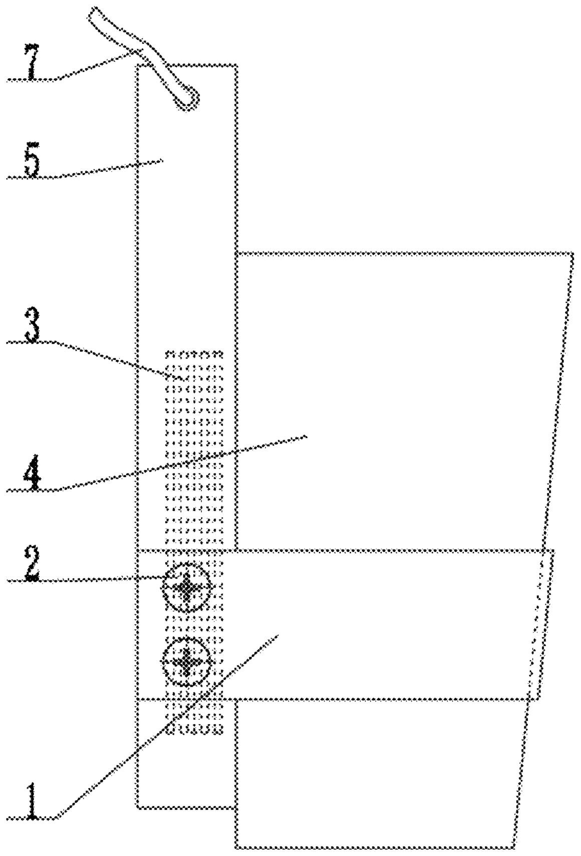
FIG. 2 is a left view of the disclosure.
Figure 3:
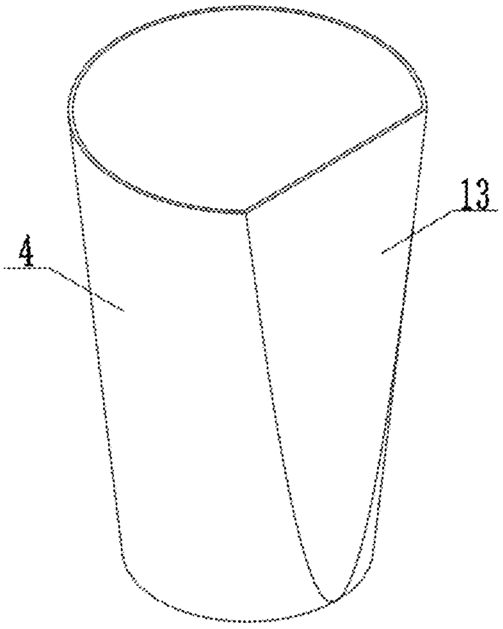
FIG. 3 is an axonometrical drawing of a tooth-brushing cup.

In the figures, 1 is a hoop, 2 is a screw, 3 is an electromagnetic coil, 4 is a tooth-brushing cup, 5 is a base, 6 is a display window, 7 is a power line, 8 is a temperature decrease button, 9 is a temperature increase button, 10 is a heating time decrease button, 11 is a heating time increase button, 12 is a power switch, 13 is a side plane, and 14 is a base panel.

DESCRIPTION OF THE EMBODIMENTS

The disclosure provides a tooth-brushing cup and heating device aiming at the defects in the prior art. The tooth-brushing cup and heating device consists of a tooth-brushing cup 4, a hoop 1, screws 2, an electromagnetic coil 3, a power line 7, a base 5, a temperature decrease button 8, a temperature increase button 9, a heating time decrease button 10, a heating time increase button 11, a power switch 12 and the like. The electromagnetic coil 3 and a control circuit are arranged in the base 5, a display window 6 is arranged at the upper part of the base, and the display window 6 is used for displaying a current temperature value, a set temperature value and a countdown value of heating time. Four buttons are arranged above the display window 6 for setting temperature increase and decrease as well as heating time increase and decrease respectively, and the power switch 12 is arranged on the right side of the display window 6. The hoop 1 is installed on the base 5, and a conical surface inside the hoop 1 is attached to the outer conical surface of the tooth-brushing cup 4. The tooth-brushing cup 4 is made of food-grade stainless steel by stamping. It is generally in a circular table shape and is large in top and small in bottom, a side plane 13 is stamped on the side wall of the tooth-brushing cup, and the side plane 13 is tightly attached to a base panel 14. The bottom surface of the tooth-brushing cup 4 is suspended in the air. Under the combined action of the gravity and the conical surface inside the hoop, the side plane 13 on the tooth-brushing cup is tightly attached to the base panel 14, and meanwhile, water on the outer wall of the tooth-brushing cup 4 naturally drops and cannot accumulate.

A conical surface of the tooth-brushing cup 4 is attached to a conical surface in the hoop 1, and the side plane 13 on the tooth-brushing cup 4 is attached to the base panel 14 while the tooth-brushing cup 4 sinks under the action of gravity, so that good heating effect is guaranteed.

The tooth-brushing cup 4 is made of food-grade stainless steel by stamping, is generally in a circular table shape and is large in top and small in bottom, a side plane 13 is stamped on the side wall of the circular conical surface of the tooth-brushing cup, and the side plane 13 is tightly attached to the base panel 14.

When alternating current is introduced into the electromagnetic coil 3 in the base 5, eddy current is generated in the stainless steel side plane 13 of the tooth-brushing cup 4 attached to the base panel 14, and the eddy current heats the tooth-brushing cup 4, and the metal wall of the side plane 13 further heats water in the tooth-brushing cup 4. A thermistor is arranged in the control circuit and used for sensing the temperature transmitted by the tooth-brushing cup 4, and heating is automatically stopped when the temperature reaches the set temperature. The control circuit can also control the heating time, a user can set the heating time according to needs, and when the set time is up, heating is automatically stopped. In the using process, one of the temperature and the heating time is set. The set values of the temperature or the heating time can be stored for a long time after the temperature or the heating time is set. The tooth-brushing cup and heating device can be heated according to the set temperature or the set heating time only by turning on a power supply every time in use, and the tooth-brushing cup 4 is short in heating time and waiting time in use due to the fact that the water volume is small and the temperature does not need to be too high. Due to the fact that the application range of people to the temperature of tooth brushing water is large, the precision requirement for heating temperature setting and heating time setting is not high, and the device is convenient to use.

The foregoing descriptions are merely exemplary embodiments of the disclosure, but are not intended to limit the disclosure. Any modification, equivalent replacement, or improvement made within the spirit and principle of the disclosure shall fall within the protection scope of the disclosure.

What is claimed is:

1. A tooth-brushing cup and heating device consisting of a tooth-brushing cup, a hoop, screws, an electromagnetic coil, a power line, a base, a temperature decrease button, a temperature increase button, a heating time decrease button, a heating time increase button and a power switch, wherein:

the electromagnetic coil and a control circuit are arranged in the base, a display window is arranged at the upper part of the base, and the display window displays a current temperature value, a set temperature value and a countdown value of heating time;

four buttons are arranged above the display window for setting temperature increase, temperature decrease, heating time increase and heating time decrease respectively, and the power switch is arranged on the right side of the display window;

the temperature decrease button, the temperature increase button, the heating time decrease button and the heating time increase button are arranged above the display window for setting temperature decrease, temperature increase, heating time decrease and heating time increase respectively, and the power switch is arranged on the right side of the display window;

the hoop is installed on the base, and a conical surface in the hoop is attached to the outer conical surface of the tooth-brushing cup;

the tooth-brushing cup is in a circular table shape, a side plane is stamped on the side wall of the tooth-brushing cup, and the side plane is attached to a base panel; and a bottom surface of the tooth-brushing cup is suspended in the air, so that the side plane on the tooth-brushing cup is attached to the base panel, and water on an outer wall of the tooth-brushing cup naturally drops and cannot accumulate.

2. The tooth-brushing cup and heating device of claim 1, wherein a conical surface of the tooth-brushing cup is attached to a conical surface in the hoop, and the side plane on the tooth-brushing cup is attached to the base panel while the tooth-brushing cup sinks under action of gravity.

3. The tooth-brushing cup and heating device of claim 1, wherein the tooth-brushing cup is made of food-grade stainless steel by stamping and is in a circular table shape and larger at a top end in relation to a bottom end, and the side plane is stamped on the side wall of the circular conical surface of the tooth-brushing cup.

* * * * *